United States Patent
Joze et al.

(10) Patent No.: US 10,931,976 B1
(45) Date of Patent: Feb. 23, 2021

(54) FACE-SPEECH BRIDGING BY CYCLE VIDEO/AUDIO RECONSTRUCTION

(71) Applicant: Microsoft Technology Licensing, LLC, Redmond, WA (US)

(72) Inventors: Hamidreza Vaezi Joze, Redmond, WA (US); Hassan Akbari, Bronx, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/600,984

(22) Filed: Oct. 14, 2019

(51) Int. Cl.
*H04N 19/895* (2014.01)
*G09B 21/00* (2006.01)
*G10L 19/02* (2013.01)

(52) U.S. Cl.
CPC ......... *H04N 19/895* (2014.11); *G09B 21/006* (2013.01); *G09B 21/009* (2013.01); *G10L 19/0204* (2013.01)

(58) Field of Classification Search
CPC ........ G06N 3/0454; G06N 3/08; G06N 20/00; G10L 15/063; G10L 13/04; G10L 25/30; G10L 15/16; G10L 15/20; G10L 15/22; G10L 15/26; G10L 17/26; G10L 17/18; G10L 15/25; G10L 15/24; G10L 19/0204; G06K 9/03; G06K 9/3233; G06T 2207/20081; G06T 9/002; G06T 2207/20084; H04N 19/895; G09B 21/006; G09B 21/009
USPC ........................................ 375/240.01–240.29
See application file for complete search history.

(56) References Cited

U.S. PATENT DOCUMENTS

| 8,751,228 | B2 | 6/2014 | Wang et al. | |
|---|---|---|---|---|
| 2009/0213938 | A1* | 8/2009 | Lee | H04N 19/70 375/240.24 |
| 2018/0082692 | A1* | 3/2018 | Khoury | G10L 17/04 |
| 2019/0171908 | A1* | 6/2019 | Salavon | G06N 3/0481 |
| 2020/0082928 | A1* | 3/2020 | Wu | G16H 80/00 |
| 2020/0205697 | A1* | 7/2020 | Zheng | G08B 29/186 |
| 2020/0293826 | A1 | 9/2020 | Liu et al. | |

OTHER PUBLICATIONS

Yang et al. "Deep Multimodal Representation Learning from Temporal Data" 2017 IEEE, 9 Pages.*

(Continued)

*Primary Examiner* — Nathnael Aynalem
(74) *Attorney, Agent, or Firm* — International IP Law Group, PLLC

(57) ABSTRACT

In an embodiment described herein, a method for face-speech bridging by cycle video/audio reconstruction is described. The method comprises encoding audio data and video data via a mutual autoencoders that comprise an audio autoencoder and a video autoencoder, wherein the mutual autoencoders share a common space with corresponding embeddings derived by each of the audio autoencoder and the video autoencoder. Additionally, the method comprises substituting embeddings from a non-corrupted modality for corresponding corrupted embeddings in a corrupted modality in real-time based at least in part on corrupted audio data or corrupted video data. The method also comprises synthesizing reconstructed audio data and reconstructed video data based on, at least in part, the substituted embeddings.

20 Claims, 11 Drawing Sheets

(56) References Cited

OTHER PUBLICATIONS

Akbari, et al., "Lip2audspec: Speech Reconstruction from Silent Lip Movements Video", In Proceedings of IEEE International Conference on Acoustics, Speech and Signal Processing, Oct. 26, 2017, 9 Pages.

Assael, et al., "Lipnet: End-to-End Sentence-level Lipreading", In The Journal of Computing Research Repository, Dec. 16, 2016, 13 Pages.

Chen, et al., "Lip Movements Generation at a Glance", In Proceedings of the European Conference on Computer Vision, Sep. 8, 2018, 16 Pages.

Chung, et al., "Lip Reading in the Wild", In Proceedings of 13th Asian Conference on Computer Vision, Nov. 20, 2016, 17 Pages.

David, Eric, "Video-Editing AI Makes Fake Obama Videos that Look Real", Retrieved From: https://siliconangle.com/2017/07/12/video-editing-ai-makes-fake-obama-videos-look-real/, Jul. 12, 2017, 8 pages.

Ephrat, et al., "Improved Speech Reconstruction from Silent Video", In Proceedings of the IEEE International Conference on Computer Vision, Oct. 22, 2017, pp. 455-462.

Ephrat, et al., "Vid2speech: Speech Reconstruction from Silent Video", In Journal of Computing Research Repository, Jan. 9, 2017, 5 Pages.

Jamaludin, et al., "You Said That?: Synthesising Talking Faces from Audio", In International Journal of Computer Vision, Jan. 16, 2019, 13 Pages.

Milner, et al., "Reconstructing Intelligible Audio Speech from Visual Speech Features", In Proceedings of 16th Annual Conference of the International Speech Communication Association, Sep. 6, 2015, pp. 3355-3359.

Ngiam, et al., "Multimodal Deep Learning", In Proceedings of the 28th International Conference on Machine Learning, Jun. 28, 2011, 8 Pages.

Oh, et al., "Speech2Face: Learning the Face Behind a Voice", In Proceedings of the IEEE Conference on Computer Vision and Pattern Recognition, May 23, 2019, pp. 7539-7548.

Petridis, et al., "Deep Complementary Bottleneck features for Visual Speech Recognition", In IEEE International Conference on Acoustics, Speech and Signal Processing, Mar. 20, 2016, pp. 2304-2308.

Rahman, MD Ashiqur, "A Comprehensive Guide to Correlational Neural Network with Keras", Retrieved From: https://towardsdatascience.com/a-comprehensive-guide-to-correlational-neural-network-with-keras-3f7886028e4a, Sep. 10, 2019, 6 Pages.

Song, et al., "Talking Face Generation by Conditional Recurrent Adversarial Network", In Journal of Computing Research Repository, Apr. 13, 2018, 7 Pages.

Zhou, et al., "Talking Face Generation by Adversarially Disentangled Audio-Visual Representation", In Proceedings of the AAAI Conference on Artificial Intelligence, vol. 33, Jul. 17, 2019, pp. 9299-9306.

Gabbay,"Visual Speech Enhancement", In Repository of arXiv:1711.08789v3, Jun. 13, 2018, 5 Pages.

Go, Yanhui, "Deep Multi-modality Soft-decoding of Very Low Bit-rate Face Videos", In Proceedings of the 28th ACM International Conference on Multimedia, 3947-3955, Aug. 2, 2020, 9 Pages.

Mostafa, Sadeghi, "Audio-Visual Speech Enhancement Using Conditional Variational Auto-Encoders", In Proceeding of IEEE/ACM Transactions on Audio, Speech, and Language Processing, Aug. 7, 2019, 11 Pages.

"International Search Report and Written Opinion Issued in PCT Application No. PCT/US20/051371", dated Dec. 9, 2020, 14 Pages.

* cited by examiner

600

700

1100

FACE-SPEECH BRIDGING BY CYCLE VIDEO/AUDIO RECONSTRUCTION

BACKGROUND

A modality may refer to a particular format of communicating information, such as human speech. Human speech is an independent modality of human communication, where the speech can be used for communication without the influence of another modality of communication. Thus, modality independence enables free communication across each independent modality. For example, deaf or hard of hearing humans often communicate by a modality that produces sound or through a modality that uses sign language. A human can understand the informational contained in each independent modality, while switching between modalities to communicate as necessary.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for face-speech bridging by cycle video/audio reconstruction is described. The method comprises encoding audio data and video data via a mutual autoencoders that comprise an audio autoencoder and a video autoencoder, wherein the mutual autoencoders share a common space with corresponding embeddings derived by each of the audio autoencoder and the video autoencoder. Additionally, the method comprises substituting embeddings from a non-corrupted modality for corresponding corrupted embeddings in a corrupted modality in real-time based at least in part on corrupted audio data or corrupted video data. The method also comprises synthesizing reconstructed audio data and reconstructed video data based on, at least in part, the substituted embeddings.

In another embodiment described herein, a system for face-speech bridging by cycle video/audio reconstruction is described. The system comprises an audio autoencoder to derive audio embeddings and a video autoencoder to derive video embeddings, wherein the audio autoencoder and the video autoencoder are mutual autoencoders. The system also comprises a common space, wherein the audio autoencoder and the video autoencoder share a common space and the audio embeddings correspond to the video embeddings, and based at least in part on a corrupted audio data or a corrupted video data, substituting embeddings from a non-corrupted modality for the corresponding embeddings in a corrupted modality in real-time.

In an additional embodiment described herein, another method for face-speech bridging by cycle video/audio reconstruction is described. The method comprises training a pair of autoencoders independently, wherein the pair of autoencoders comprises an audio autoencoder and a video autoencoder. The method also comprises deriving a bridge across an audio modality of the audio autoencoder and a video modality of the video autoencoder, wherein audio embeddings of the audio autoencoder and video embeddings of the video autoencoder are of the same dimensions in a common space shared by the audio autoencoder and the video autoencoder. Additionally, the method includes substituting corresponding embeddings from a modality without data loss based at least in part on data loss in one of the audio modality or the video modality.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
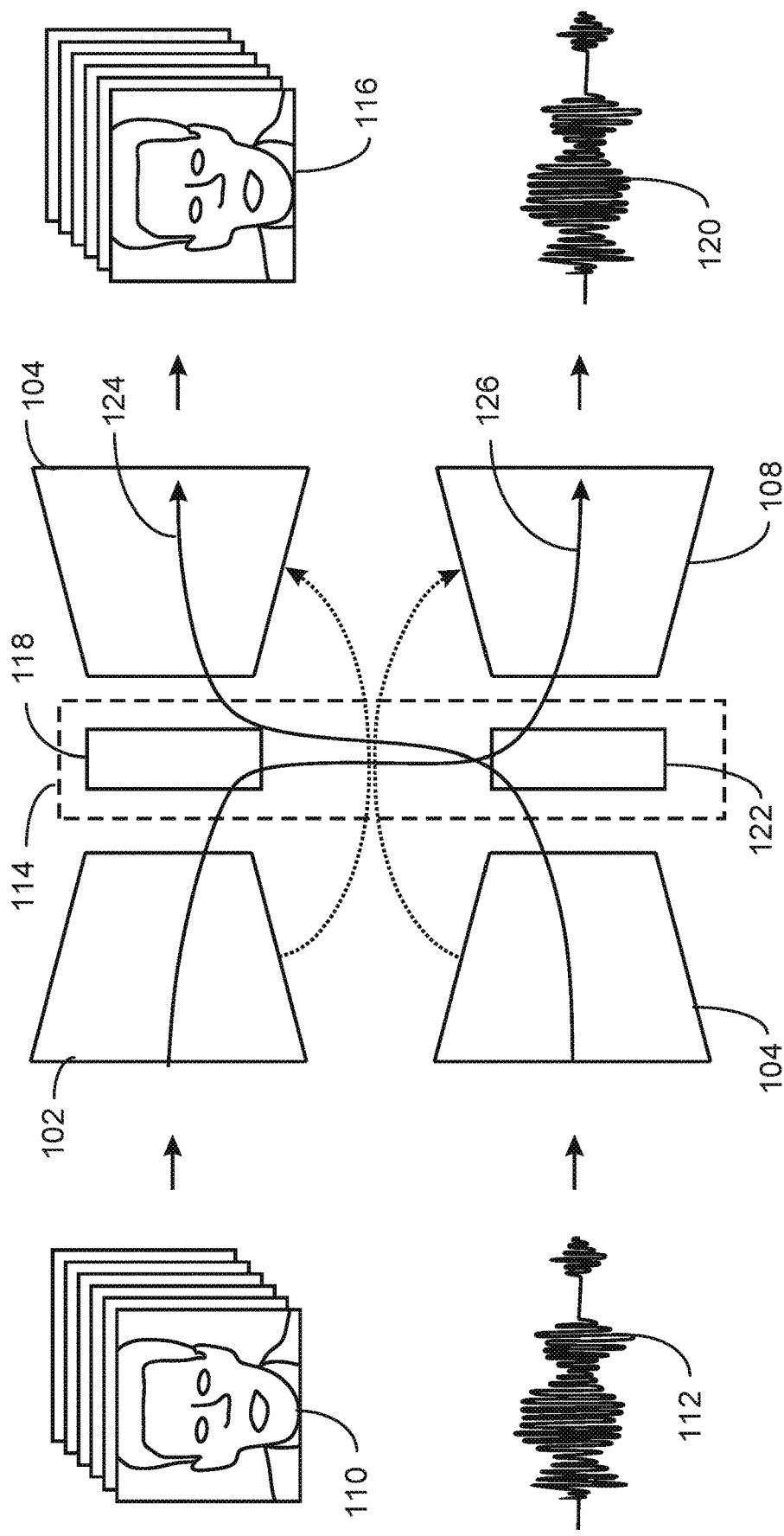
FIG. 1 is a block diagram of a face-speech bridging model.

Humans may perceive a modality of communication, such as speech, by interpreting audio from a human outputting the speech. The human may also observe the corresponding lip movements of the human outputting the speech when interpreting the audio from the human outputting the speech. While the human speech is modality independent, in most scenarios it is easier for a human to interpret or perceive speech when it is accompanied with visual cues such as the corresponding lip movements and face expression of the human outputting the speech. In some scenarios, the visual cues may also be considered an independent modality of communication. Thus, human speech is modality independent, and the concepts contained in a communication can be determined by audio alone, or by visual cues alone. Visual cues include stimuli visually observed by a human. The stimuli may be obtained from the real world or observed in a video playback.

Accordingly, a human can determine if an audio-video (AV) pair of modalities communicates the same concepts. Put another way, a human can quickly determine if perceived audio data matches or corresponds to observed video data of a human outputting the speech. When a human determines that the perceived audio data corresponds to the observed video data, the human can often determine the concepts communicated by the correlated modalities of communication, even when one modality is interrupted or otherwise unavailable. The corresponding modalities of communication share some common information as determined by the human.

The present techniques enable face-speech bridging by cycle audio/video reconstruction. In embodiments, a video and an audio of a speech utterance from a human are mutually autoencoded while maintaining a mid-level representation of each modality that corresponds to the mid-level representation of the remaining one or more modalities. The mid-level representation may be referred to as an embedding. Mutual autoencoding, as used herein, refers to converting information from one or more modalities of communication that share a same relation toward other modalities of the one or more modalities of communication. This same relation may be enforced by a bottleneck loss function as described below. In this manner, the one or more modalities are entangled with each other, such that a same representation of information across each of the one or more modalities of communication exists. This enables a mutual two-way bridge of information sharing across the one or more modalities. In the example of an audio/video modality pair, the present techniques enable a two-way bridge between these modalities. In particular, the audio data can be reconstructed from the video data, and the video data can be reconstructed from the audio data. This mutual two-way bridging via autoencoding has a number of use applications, such as video/audio quality enhancement, helping people with hearing or vision loss, improved audio-visual speech recognition, and improved emotion recognition.

The present techniques enable an improvement over conventional techniques by ensuring the accuracy of video or audio data output by a computing device. In the event of signal loss or corruption the present techniques enable a substitution of data from the informative modality to the corrupt modality to reconstruct the lost information in the corrupt modality, where each modality presents the same concept. Put another way, with two modalities of communication presenting the same information, such as video and audio, a first modality can freely obtain accurate encoded data representations form the second modality when loss or corruption occurs in the first modality. To achieve this free sharing of information across modalities, the encoded mid-level data representations of each modality are forced to be similar, where no additional processing is required to substitute data from one modality to another. Put another way, mid-level representations of each modality are available for substitution as necessary. In the case of audio and video modalities, encoded video data is reshaped and fed to a bidirectional LSTM training system to preserve temporal dependencies between audio and video data. As a result, the number of samples of video data is made to be the same as the number of samples expected from the audio data. Moreover, the audio data is encoded using context from a spectral envelope to ensure robust encoded audio data.

Figure 10:
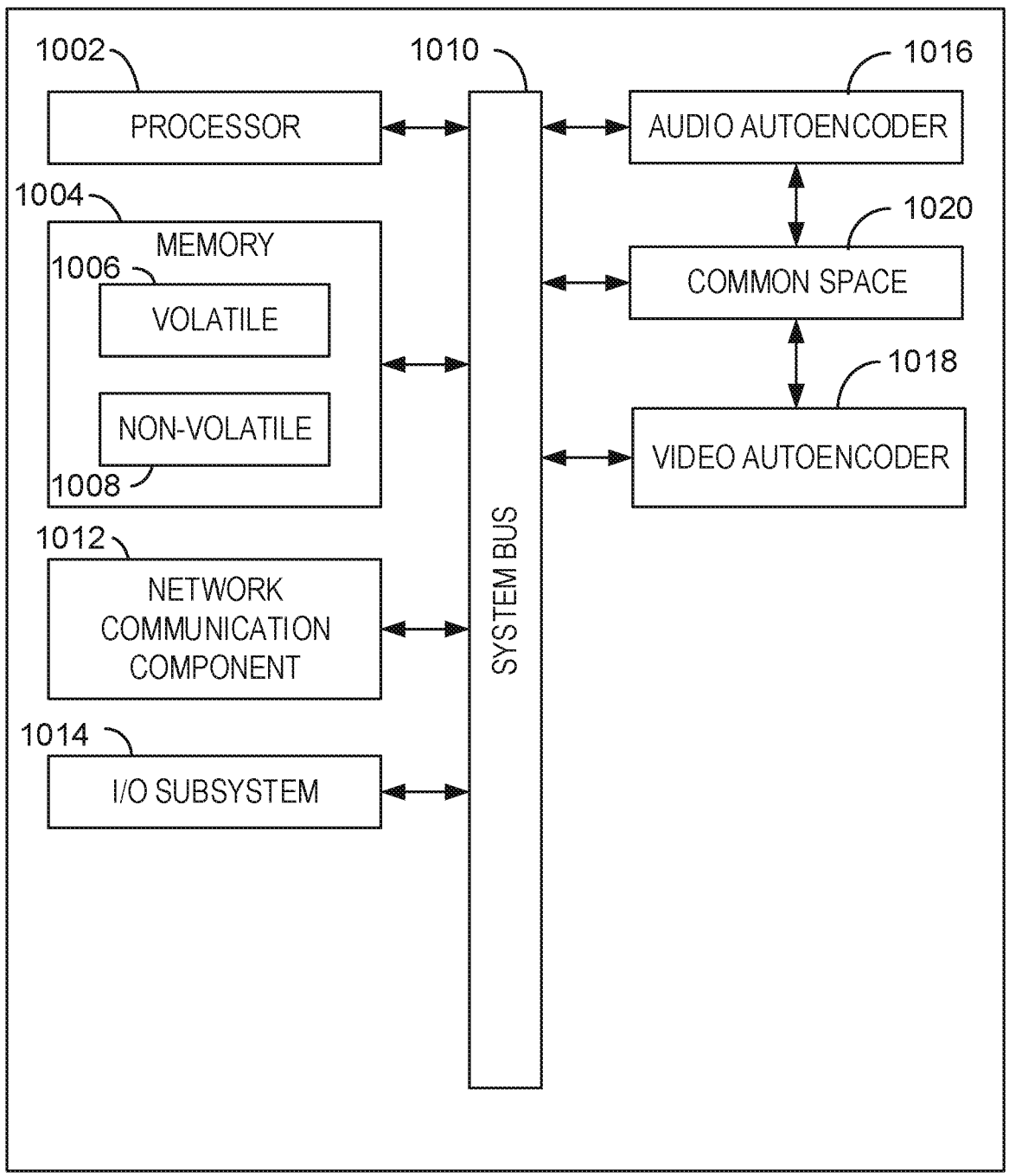
FIG. 10 is a block diagram illustrating an exemplary computing device that enables face-speech bridging by cycle audio/video reconstruction according to aspects of the disclosed subject matter.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 10 discussed below, provides details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device.

FIG. 1 is a block diagram of a face-speech bridging model 100. The face-speech bridging model 100 enables face-speech bridging by cycle audio/video reconstruction as described herein. As illustrated in FIG. 1, the face-speech bridging model 100 comprises a video encoder portion 102, a video decoder portion 104, an audio encoder portion 106, an audio decoder portion 108, and a common space 114. In embodiments, the video encoder portion 102 and video decoder portion 104 may be components of a video autoencoder. The audio encoder portion 106 and the audio decoder portion 108 may be components of an audio autoencoder.

An autoencoder, such as the video autoencoder and/or the audio autoencoder described above, is a neural network with equal input and output sizes. During training, the neural network learns to reconstruct the input to derive the output according to an unsupervised learning model by minimizing a reconstruction error $\mathcal{L}$. The autoencoder may have an internal, hidden layer that describes a code or common space used to represent the input. Thus, an autoencoder may contain an encoder that maps the input data into the code or common space, the particular common space with mid-level representations of the input data, and a decoder that maps the code or common space to a reconstruction of the input data. In embodiments, the autoencoder may also be further specialized to perform a dimensionality reduction by including a lower dimensional hidden layer. In particular, the common space may constrain the mid-level representations of the input data to be reduced to smaller dimensions than the input data. In some scenarios, this lower dimensional hidden layer may be referred to as a bottleneck. In order to minimize the error between the input data and the reconstructed output data, a training objective of the autoencoder effectively causes the model to learn a transformation from the input space to this lower-dimensional hidden layer and back to a reconstructed output space of the same dimensionality as the input space.

In execution, video data 110 is input to the video encoder portion 102. In embodiments, the video data 110 may be a series of video frames. Similarly, audio data 112 corresponding to the video data 110 is input to the audio encoder portion 104. The audio data 112 may be comprised of a series of audio frames. Traditionally, dependent upon the particular encoding schemes for the audio and video data, the dimensions of a space used to encode/decode the audio may be smaller than the space used to encode/decode the video.

As illustrated in FIG. 1, the common space 114 may represent neural layers, code, latent variables, or latent representations used to map the input data to a reconstruction of the input data. In particular, the video data 110 may be mapped to a reconstructed video data or output video data 116 via the common space 114. The video data 110 may be reduced to the dimension of the common space 114 via a space 118. Similarly, the audio data 112 may be mapped to a reconstructed audio data or output audio data 120 via the common space 114. The audio data 112 may be reduced to the dimension of the common space 114 via a space 122.

Accordingly, the video encoder portion 102 may take as input the video data 110, which is encoded into the video space 118. Similarly, the audio encoder portion 104 may take as input the audio data 112, which is encoded into the audio space 122. During typical encoding, the video space 118 is of different dimensions than the audio space 112. The space 114 according to the present techniques is a common space, where the encoded mid-level representations from the video encoder portion 102 and the audio encoder portion 104 are forced to be similar or the same. Thus, within the video space 118, mid-level representations of the video data 110 may be derived, and within the audio space 122, mid-level representations of the audio data 112 may be derived. The audio autoencoder and the video autoencoder are trained so that the respective mid-level representations of data are the same or substantially similar, resulting in a common space 114 for both modalities that includes the space 114 and the space 122.

The hidden layers of the video autoencoder and the audio autoencoder are trained such that the dimensionality of the encoded video data and the encoded audio data are similar, the same, or substantially the same. As used herein, mid-level data representations that are similar, the same, or substantially the same may mean that the mid-level data representations share the same dimensionality. In embodiments, mid-level data representations that are similar, the same, or substantially the same refers to a similar mid-level data representation from each modality at a particular observation i.

Based on the encoded mid-level representations, the input video data 110 and input audio data 112 may be reconstructed. Once the model is trained, a video/audio can be encoded via the common space, and then the audio/video can be reconstructed. Within the common space, a first mid-level representation of data from a first modality may be substituted for a second mid-level representation of data from a second modality during the reconstruction of the input of the second modality. In this manner, bridging of information between modalities may occur. This bridging is illustrated by solid line 124 and dashed line 126. Solid line 124 represents a bridge from the audio modality to the video modality. Dashed line 126 represents a bridge from the video modality to the audio modality. In embodiments, when data from one modality is determined to be corrupted, the common space 114 enables a bridge from one modality to another to ensure accurate video and audio reconstruction. In particular, in the event of corrupted audio, a bridge from the video modality to the audio modality may be used to reconstruct the audio that is corrupted. Likewise, in the event of corrupted video, a bridge from the audio modality to the video modality may be used to reconstruct the video that is corrupted. As described below, this bridged reconstruction may be enabled by a single dimensionality throughout the common space. In particular, mid-level representations such as embeddings of video and audio data may be similar and enable face-to-speech and speech-to-face reconstruction via bridging as described herein. Moreover, in order to increase the accuracy of the reconstructed sequences, an adversarial network may be executed which can determine the difference between the original data and reconstructed data.

The bridging according to the present techniques is enabled via mutual autoencoders as discussed above, one autoencoder for video data and one autoencoder for audio data. The video autoencoder and the audio autoencoder are trained separately. For ease of description and explanation, the training data may be obtained from the Global Research Identifier Database (GRID) dataset, which includes thirty-four speakers with limited words. Other training data may be used. During training, speech synthesis parameters may be extracted from the training data. For example, the extracted speech parameters may be WORLD parameters as described by M. Morise, F. Yokomori, and K. Ozawa: WORLD: a vocoder-based high-quality speech synthesis system for real-time applications, IEICE transactions on information and systems, vol. E99-D, no. 7, pp. 1877-1884, 2016. In embodiments, the speech synthesis parameters enable neural speech synthesis from the input video. In the examples described herein, the audio sampling frequency for data input to the audio autoencoder may be, for example, 16 kHz. The video frame rate for video data input to the video autoencoder may be, for example, 25 fps. The video frames may be cropped to a size of 112×112 pixels and primarily contain a face of a human. The video autoencoder may be trained to extract facial landmarks using a library or toolkit with machine learning algorithms. In particular, a library such as DLib may be used to extract sixty-eight coordinates (x, y) that map facial points on a human face. DLib may be used to extract a 68×2 element matrix where each row of the element matrix corresponds to a coordinate of a particular feature point in the input image.

To create encoded representations of video and audio data that are similar, the same, or substantially the same, the difference in sampling rates for the video and audio data must be overcome. For more stable training of each independent autoencoder, different batch sizes for audio autoencoding and video autoencoding may be used. In training the autoencoders, there are many options for error back propagation that should be considered. For example, error may be propagated through both encoders when making bottlenecks to be similar to each other. In another example, encoded-decoded error may be propagated through all possible networks. In another example, encoded-decoded error may be propagated through only the encoder part or the decoder part of the autoencoder. Additionally, a proper loss definition for loss in each of the video autoencoder and the audio autoencoder is determined. When calculating the reconstructed outputs 116 and 120, the space 114 may be trained to minimize any reconstruction errors or loss.

A loss function may be constructed with a term that is sensitive to the input data, such as the reconstruction loss $\mathcal{L}$. In some loss functions, a regularization term may be added to prevent overfitting of the input data during reconstruction. Additionally, a tuning parameter $\lambda$ may be used in a loss function to scale the regularization term so that regularization can be modified in view of input data sensitivity.

The present techniques minimize a bottleneck loss function. The bottleneck loss may be represented by the loss function as defined by Eq. 1:

$$\mathcal{L}_{Bottleneck} = \mathcal{L}_{MC2}(E_{Video}, E_{Audio}) \quad \text{Eq. 1}$$

The loss function of Eq. 1 is minimized via regression when training the face-speech bridging model. In execution, the trained mutual autoencoders may use loss functions within each autoencoder to determine when to substitute one set of embeddings as derived by a first autoencoder for another set of embeddings as derived by a second autoencoder. In Eq. 1, the mean square error-correlation coefficient (MSE-Corr2) loss ($\mathcal{L}_{MC2}$) is determined for each of the video embeddings $E_{Video}$ and the audio embeddings $E_{Audio}$, which should each be close to 1 to indicate a high correlation across embeddings. The MSE-Corr2 loss ($\mathcal{L}_{MC2}$) is defined by Eq. 2:

$$\mathcal{L}_{MC2} = \frac{1}{n}\sum_i(y_i - \hat{y}_i)^2 - \frac{\sum_i(y_i - \bar{y}_i)(\hat{y}_i - \bar{\hat{y}}_i)}{\sqrt{\sum_i(y_i - \bar{y}_i)(\hat{y}_i - \bar{\hat{y}}_i)^2}} \quad \text{Eq. 2}$$

In Eq. 2, y represents the ground truth or original data, $\hat{y}_i$ represents the rescontructed data at observation i, $\bar{y}_i$ represents an average of the ground truth or original data at observation i, and $\bar{\hat{y}}_i$ represents the reconstructed average data at observation i.

Each of the autoencoders is trained separately, then a space to bridge across the separate modalities is described. Thus, the audio autoencoder loss of Eq. 3 is used to train an audio autoencoder, where the audio autoencoder loss may be calculated as defined by Eq. 3 between the original audio input A and the reconstructed audio Â:

$$L_{MC2}(A, \hat{A}) \quad \text{Eq. 3}$$

Similarly, the video autoencoder loss of Eq. 4 is used to train the video autoencoder, where the video autoencoder loss may be calculated as defined by Eq. 4 between the original video data and the reconstructed video data, where L is a coordinate (x, y) of the landmarks in the original video input and L̂ is a coordinate of the landmarks in the reconstructed video:

$$\mathcal{L}_{MC2}^{Face}(L,\hat{L}) + \lambda \mathcal{L}_{MC2}^{Lip}(L,\hat{L}) + \lambda \mathcal{L}_{Diff}^{Face}(L,\hat{L}) \quad \text{Eq. 4}$$

In Eq. 4, the MSE-Corr2 error is applied to landmarks of the contour of the face $\mathcal{L}_{MC2}^{Face}$ and also to landmarks along the lips $\mathcal{L}_{MC2}^{Lip}$. To preserve the time differentiation, where the original or reconstructed landmark is changing smoothly, the derivative of the landmark should be close to 0. This means the derivatives of the reconstructed landmarks should also be close to 0. The time differentiation term may eliminate overfitting in the video autoencoder by reducing error within the video autoencoder loss of Eq. 4. The time differentiation loss $\mathcal{L}_{Diff}$ in the video autoencoder loss function may be calculated as defined by Eq. 5:

$$\mathcal{L}_{Diff} = \sum_i \left| \frac{\partial y_i}{\partial t} - \frac{\partial \hat{y}_i}{\partial t} \right| \quad \text{Eq. 5}$$

Figure 2:
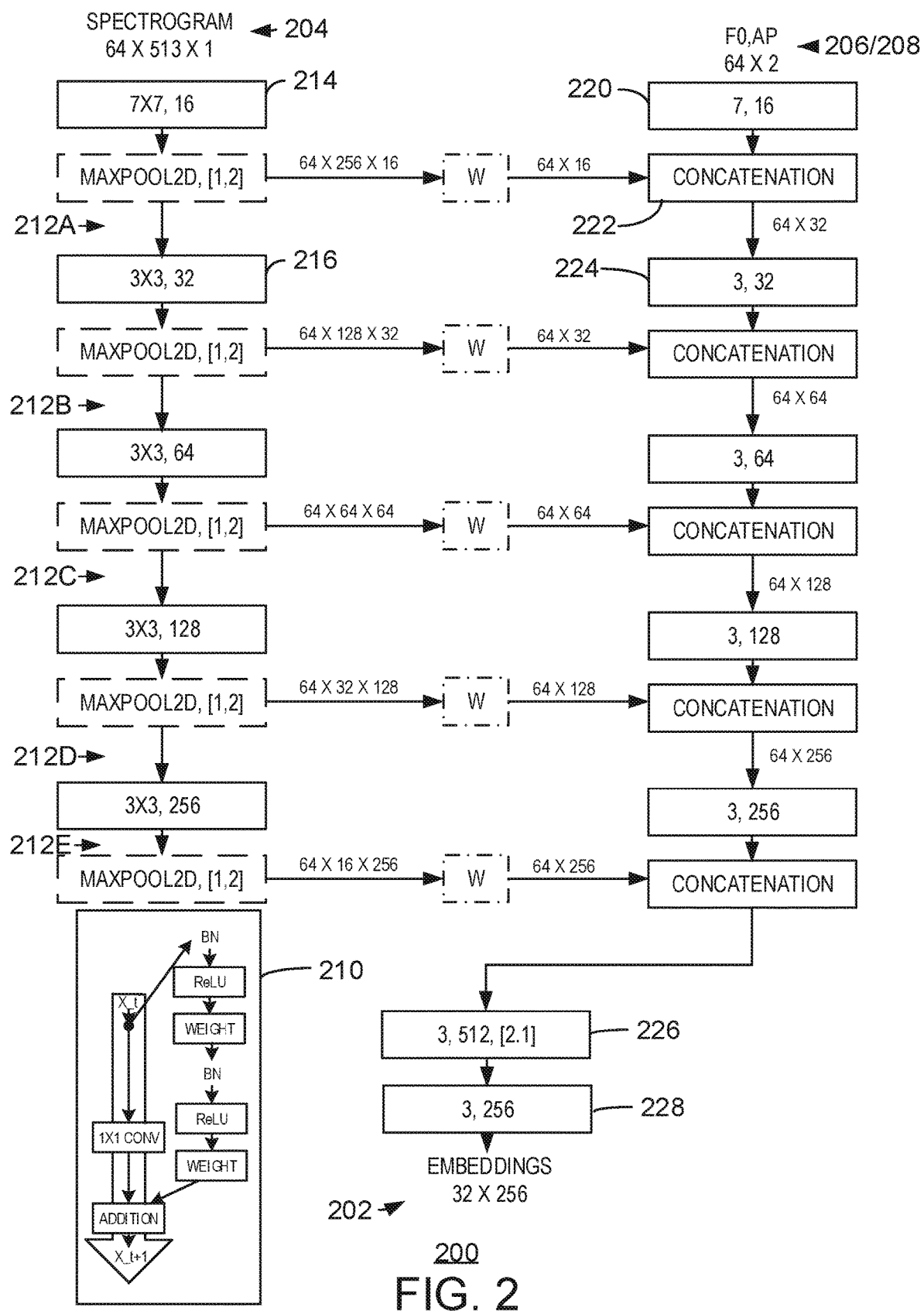
FIG. 2 illustrates an exemplary encoder portion of an audio autoencoder.
Figure 3:
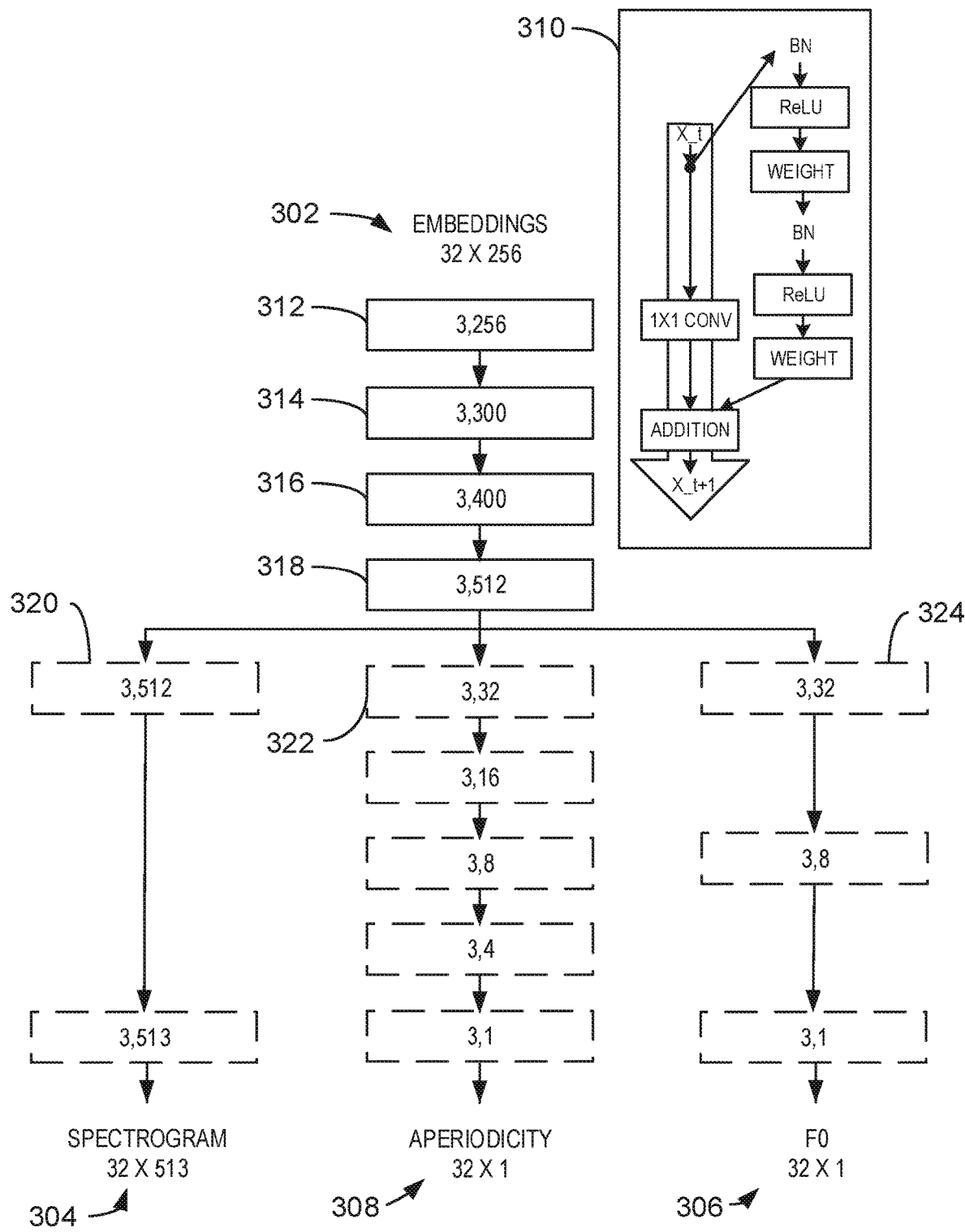
FIG. 3 illustrates an exemplary decoder portion of the audio autoencoder.
Figure 4:
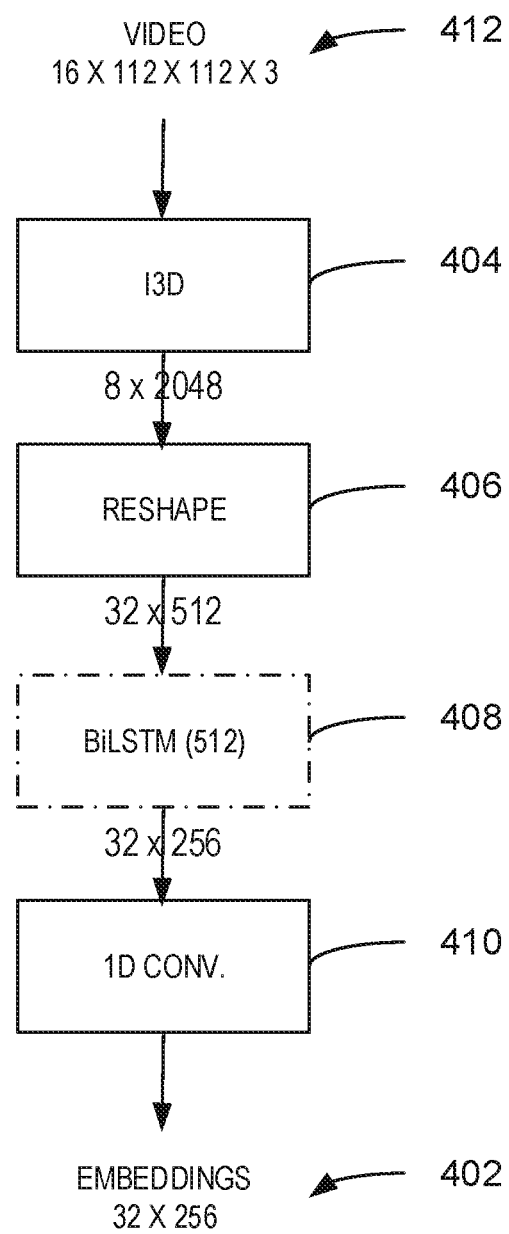
FIG. 4 illustrates an exemplary encoder portion of a video autoencoder.
Figure 5:
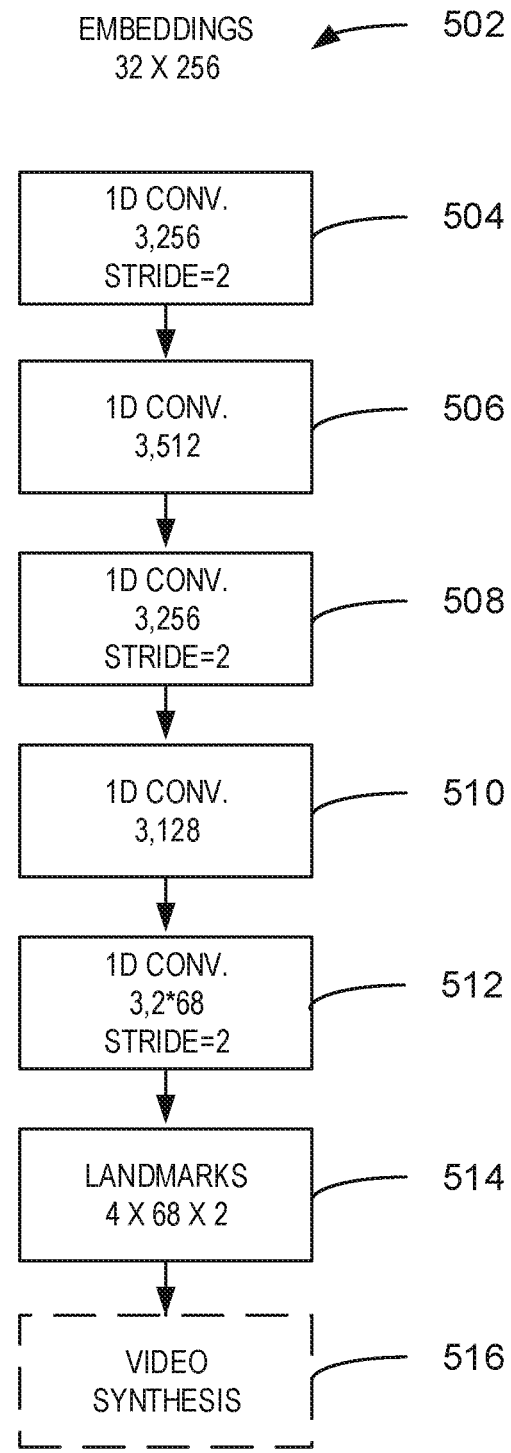
FIG. 5 illustrates an exemplary decoder portion of the video autoencoder.

Each of the audio autoencoder and the video autoencoder may be trained separately using the loss functions described above. The loss function evaluates the particular algorithms used to reconstruct original data that has been at least reduced in dimensionality. FIGS. 2-5 illustrate an exemplary audio autoencoder and video autoencoder as trained according to the loss functions described above. In particular, FIG. 2 illustrates an exemplary encoder portion of an audio autoencoder, FIG. 3 illustrates an exemplary decoder portion of the audio autoencoder, FIG. 4 illustrates an exemplary encoder portion of a video autoencoder, and FIG. 5 illustrates an exemplary decoder portion of the video autoencoder.

FIG. 2 illustrates an exemplary encoder portion 200 of an audio autoencoder that enables face-speech bridging by cycle audio/video reconstruction as described herein. In particular, parameters extracted from the audio dataset includes a spectrogram of the audio data, a fundamental frequency (FO), and band aperiodicities (ap). In FIG. 2, the input audio is converted into trainable embedding representations 202. In embodiments, the embedding's 202 represent a relatively low dimensional space to which high dimensional vectors are translated. Thus, an embedding may be a compressed representation of input data. An embedding can be learned and reused across various models. In embodiments, embeddings may be used to map frames of data to low-dimensional real vectors in a way that similar items are close to each other according to a similarity metric. In particular, a frame of audio data and a frame of video data may be mapped in a way that similar audio data and video data are close to each other in the common space. As used herein, being close refers to satisfying a similarity metric. Thus, jointly embedding diverse data types such as audio and video can be accomplished by defining a similarity metric between the audio and video. This similarity metric may be obtained by minimizing a loss, such as the Mean Squared Error minus Correlation (MSE-Corr), with a lower bound value of −1.

The spectrogram 204 represents the frequency component of the audio data. In some cases, the spectrogram 204 may be a modulation spectrogram extracted from a speech spectrogram via a short-term spectral analysis. In embodiments, the spectrogram 204 may be a graph of all the frequencies that are present in a sound recording for a given amount of time or a given number of audio frames. The frequency data may be of a dimension 64×513×1.

During training, the embedding layer of the audio autoencoder may be learned via back propagation. For example, the audio input includes a spectrogram 204 of the audio signal that is extracted from the training dataset, with a dimensionality of 64×513×1. The fundamental frequency FO 206 and band aperiodicities (ap) 208 are also extracted from the audio of the training dataset. As illustrated, five convolution layers may be used to derive the embeddings. The output embeddings have a dimensionality of 32×256. Thus, for a batch B of data, there are 32 vectors used to represent the embeddings, where each vector has 256 elements. These resulting embeddings translate the input audio data into a lower-dimensional space that preserves semantic relationships of the data.

In particular, as illustrated in FIG. 2 the exemplary encoder portion 200 of an autoencoder includes five convolutional layers 212A, 212B, 212C, 212D, and 212E. Each convolutional layer includes residual blocks, where a 1×1 convolution is performed as illustrated at 1D convolution legend 210. As illustrated in the 1D convolution legend 210, a one-dimensional (1D) convolution is performed by, for example, a residual network (ResNet). In particular, a BN layer is executed followed by a rectified linear unit (ReLU) block. The output of the first ReLU is weighted an input into a second BN layer. The output of the second BN layer is sent to a second ReLU block, and a second weight is applied to the output of the second ReLU block.

The audio autoencoder enables encoding via neural networks, where the neural network is a number of layers defined by the execution of a number of filters on the input to the layer. Each filter may be referred to as a kernel, where each 1D convolution layer that may enable a convolutional filter. In embodiments, the size of the kernel refers to the width and height of the window or filter mask applied to the input data. A maxpooling layer may be applied to the filtered or masked data from the kernel to return data points with a maximum value from the set of input data from the kernel.

As illustrated, generally each convolutional layer applies a convolutional filter or kernel of a particular size and depth, executes maxpooling on the frequency bands, applies a weighted average to the frequency bands of the convolved and maxpooled spectrogram, and then concatenates the weighted, maxpooled data with fundamental frequency FO and band aperiodicity data. For example, in a first convolution layer 212A, at block 214 a kernel of size 7×7 with a depth of 16 is applied to the time and frequency data as represented by the spectrogram in a 2D convolution. At block 214 sixteen 7×7 windows may be applied to the input frequency data or spectrogram, which is of size 64×513×1. At block 216, two-dimensional maxpooling may be applied to the output of the kernel at block 214 to enable downsampling of the output of the kernel at block 214. The resulting data is of size 64×256×16.

At block 218 a weighted average is applied to the 256 dimensions output from the maxpooling at block 216. Here, the frequency information is combined in a weighted fashion to obtain a weighted average of size 64×16. The weighted average of this first convolutional layer is input to a concatenation block 220. The concatenation block 220 takes as input the fundamental frequencies and band aperiodicities that have been filtered by a kernel at block 222. The filter at block 222 is a window of size 7 applied sixteen times to the fundamental frequencies and band aperiodicities data with size 64×2. The output of the filtered fundamental frequencies and band aperiodicities are concatenated with the weighted average spectrogram data of size 64×16. The resulting concatenated data is of size 64×32 and is input to block 224 for further convolutional filtering in the next convolutional layer 212B. In this manner, the fundamental frequency information and band aperiodicities are encoded using information from the spectrogram by concatenating the spectrogram information with the fundamental frequencies and band aperiodicities. In particular, the fundamental frequency (FO) and aperiodicities (ap) are encoded using a context from spectral envelope (spectrogram). In practice, encoding the fundamental frequency (FO) and aperiodicities (ap) separately from each other and separate from spectrogram will result in a lower quality system when compared to the contextual encoding according to the present techniques.

In a similar fashion, each of the convolution layers 212A, 212B, 212C, 212D, and 212E further reduce the dimensionality of the input audio data. In particular, contextual information may be extracted from the fundamental frequency and aperiodicity. The contextual information is concatenated with the spectrogram via the five convolution layers 212A, 212B, 212C, 212D, and 212E. At block 226, a final convolution over the contextual information is concatenated with the spectrogram is executed. At block 228, three 1D convolutions are filtered by 512 filters, with a stride of 2. This filtered data is input to block 226, where a filter with a window of size 3 is applied 256 times. This results in embeddings of size 36×256.

FIG. 3 is an illustration of the decoder portion 300 of the audio autoencoder that enables face-speech bridging by cycle audio/video reconstruction as described herein. The embeddings 302 may be the same as the embeddings 202

(FIG. 2), and are of size 32×256. In embodiments, the embeddings 302 may be used to reconstruct the spectrogram 304, aperiodicities 308, and fundamental frequencies F0 306. As illustrated, a series of four residual blocks 312, 314, 316, and 318 may be applied to the embeddings. At blocks 320, 322, and 324, 1D convolution may be applied to the output of residual block 318. Each 1D convolution block may be include at least a kernel, batch normalization, and ReLU as illustrated by the 1D convolution legend 310.

In this manner, the audio autoencoder, which includes the encoder portion 200 and the decoder portion 300, is trained to minimize a reconstruction error as represented in the loss function of Eq. 3. The loss function enables maximizing a lower bound on the mutual information between the input audio data and the learned reconstructed audio data.

FIG. 4 is an illustration of the encoder portion 400 of the video audio encoder that enables face-speech bridging by cycle audio/video reconstruction as described herein. The video autoencoder takes as input a video 402. The video 402 may have a dimensionality of 16×112×112×3, where the input is in the form of [time×dimension×dimension×number of channels]. At block 404, a two-stream Inflated 3D ConvNet (I3D) is applied to the video 402. In execution, the I3D at block 404 activates inflated three-dimensional filters and pooling kernels of very deep image classification ConvNets. In particular, 2DConvNets may be inflated into 3D. Put another way, the I3D mechanism may perform convolution on the video input with filters or kernels of multiple sizes. In particular, maxpooling may be performed after each filter, and the outputs are concatenated and filtered. In this manner, seamless spatio-temporal feature extractors are learned from the input video. The output may be 8×2048.

At block 406, reshaping is applied to the output of the I3D module. Reshaping changes the shape of the data from 8×2048 to 32×512. Reshaping is used to reshapes the logits to a T×D shape tensor. That tensor is fed to a BiLSTM to extract the T×256 embedding tensor. Thus, logits are reshaped to time (T) and embedding dimension (D). At block 408, a bidirectional long short-term memory (BiLSTM) is applied. Since the logits dimension is directly reshaped to the time and embedding dimension, the BiLSTM is used to correct any discontinuity. The use of BiLSTM increases the quality of the resulting network as well as the training convergence speed. The output of block 408 is of size 32×256.

In embodiments, reshaping at block 406 and BiLSTM at block 408 preserves the temporal dependencies between audio and video data. For example, each video frame corresponds to four eight samples. Thus, reshaping and BiLSTM ensures that audio samples derived from the video embeddings are calculated with the correct temporal dependency. In particular, reshaping enables solving the difference in sampling frequencies (upsampling 8 frames to 32 time samples) and the BiLSTM enables better convergence and final system quality.

As described above, the sampling rate between video and audio data is different. For example, the sampling frequency of audio data may be 200 samples per second, while the sampling frequency of the video data is 25 samples per second. Thus, for each sample of the video stream, eight corresponding audio samples are obtained. Preserving the correct temporal dependencies of the video embeddings enables the context of the data to be persevered. This enables the correct order and placement of phonemes derived from the video embeddings. Note that some phonemes are dependent on previous phonemes or subsequent phonemes. At block 410, 1D convolution is applied. The 1D convolution preserves the smoothness of the video data over time. The result of the 1D convolution at block 410 are embeddings 412. The embeddings 412 have a dimensionality of 32×256.

FIG. 5 is an illustration of the decoder portion 500 of the video autoencoder. The embeddings 502 may be the same as the embeddings 402 (FIG. 4). In embodiments, the embeddings 502 may be used to ultimately enable video synthesis 518. In FIG. 5, embeddings are input to a first convolution layer at block 504. The 1D convolution at block 504, 3, 256, Stride=2. At block 506, a second convolution layer is executed, with a 1D convolution, 3, 512. At block 508, a third convolution layer is executed, with 1D convolution, 3, 256, Stride=2. At block 510, a fourth convolution layer is executed, with 1D convolution, 3, 128. At block 512, a fifth convolution layer is executed with 1D convolution, 3, 2*68, Stride=2.

The result of the five convolution layers 504, 506, 508, 510, and 512 are landmarks 514. In particular, the landmarks may be in the form of a 68×2 element matrix where each row of the element matrix corresponds to a coordinate of a particular feature point in the input image. Thus, the landmarks may have a dimensionality of 4×68×2. The landmarks may be used for video synthesis at block 516. Video synthesis using landmarks may be performed via a meta-learning architecture that maps input face landmarks to output frames through a set of convolutional layers, which are modulated by the embedding vectors via adaptive instance normalization.

By configuring the audio and video autoencoders to derive embeddings of the same dimensionality, embeddings from the audio autoencoder may be substituted for a corrupt video signal and used to derive the correct reconstructed video signal. Similarly, embeddings from the video autoencoder may be substituted for a corrupt audio signal and used to derive the correct reconstructed audio signal. In embodiments, additive Gaussian noise may be fed to the bottleneck features. As used herein, the bottleneck features are used to specialize the autoencoder to perform dimensionality reduction by including a lower dimensional hidden layer or bottleneck. In this manner, the decoder becomes more robust to unwanted changes in bottleneck.

The present techniques do not process lip movements for phoneme or word classification, as such an implementation may lose temporal mappings across the input data. The bridging as described by the present techniques enables a two-way bridge between video and audio of a person talking. In particular, bridging between modalities is available simultaneously, where data from a first modality can be substituted for data from the other modality in real time.

Figure 6:
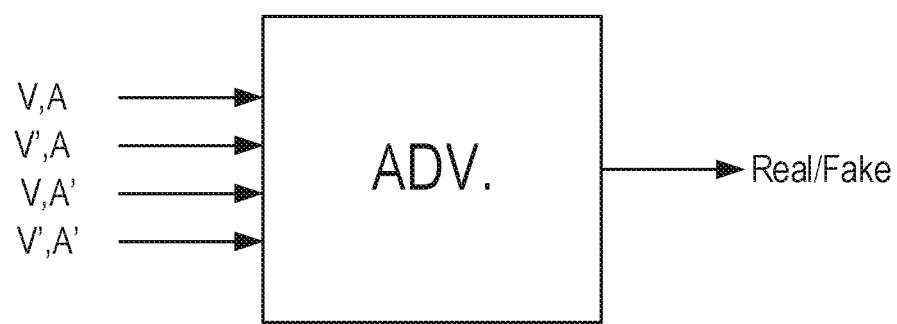
FIG. 6 is an illustration of a general adversarial network.

FIG. 6 is an illustration of an adversarial network 600. The adversarial network 600 includes dual neural networks a referred to as a generator and a discriminator. The generator may take as input landmarks and embeddings. The generator may map the landmarks into reconstructed frames through a set of convolutional layers, which are modulated by the embeddings. Corresponding audio data may be derived. Accordingly, there are four possible inputs to the adversarial network: the ground truth video data V and the ground truth audio data A; the reconstructed video data V' and the ground truth audio data A; the ground truth video data V and the reconstructed audio data A'; and the reconstructed video data V' and the reconstructed audio data A'. For each combination, the adversarial network can output a realism score for each combination. In embodiments, the realism score may be used as a feedback or penalty for the main autoencoding networks. Additionally, in embodiments, the adversarial network may have a generator takes in random numbers and returns an image. The generated image is fed into the discriminator alongside a stream of images taken from the actual, ground-truth dataset. The discriminator takes in both real and fake images and returns probabilities, a number between 0 and 1, with 1 representing a prediction of authenticity and 0 representing fake.

Figure 7:
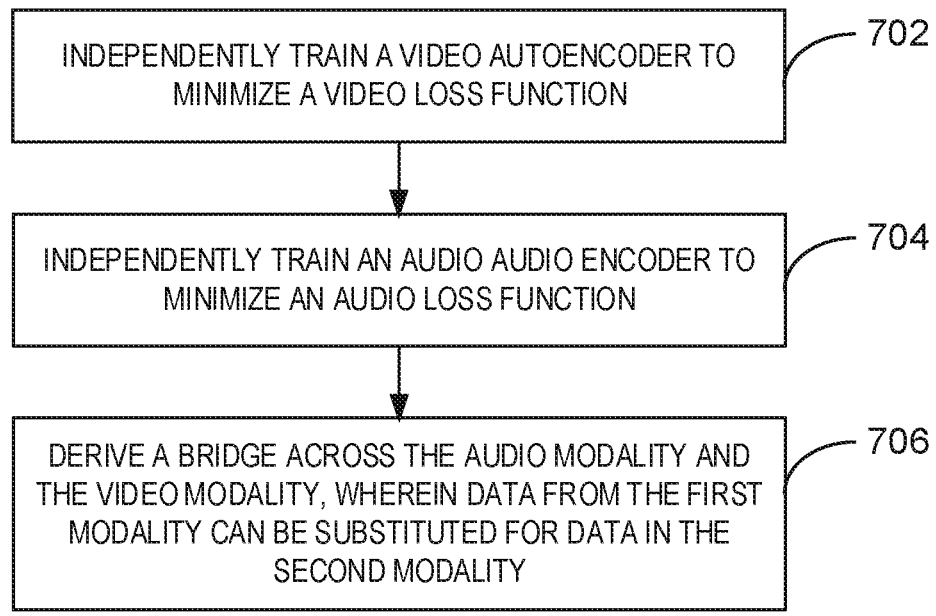
FIG. 7 is a process flow diagram of a method for training mutual autoencoders for face-speech bridging by cycle video/audio reconstruction.

FIG. 7 is a process flow diagram of a method for training mutual autoencoders for face-speech bridging by cycle video/audio reconstruction. At block 702, a video autoencoder is independently trained to minimize a video loss function. At block 704, an audio autoencoder is independently trained to minimize an audio loss function. At block 706, a bridge is derived between the video autoencoder and the audio autoencoder. The bridge enables the substitution of encoded data across modalities, wherein data from the first modality can be substituted for data in the second modality.

Figure 8:
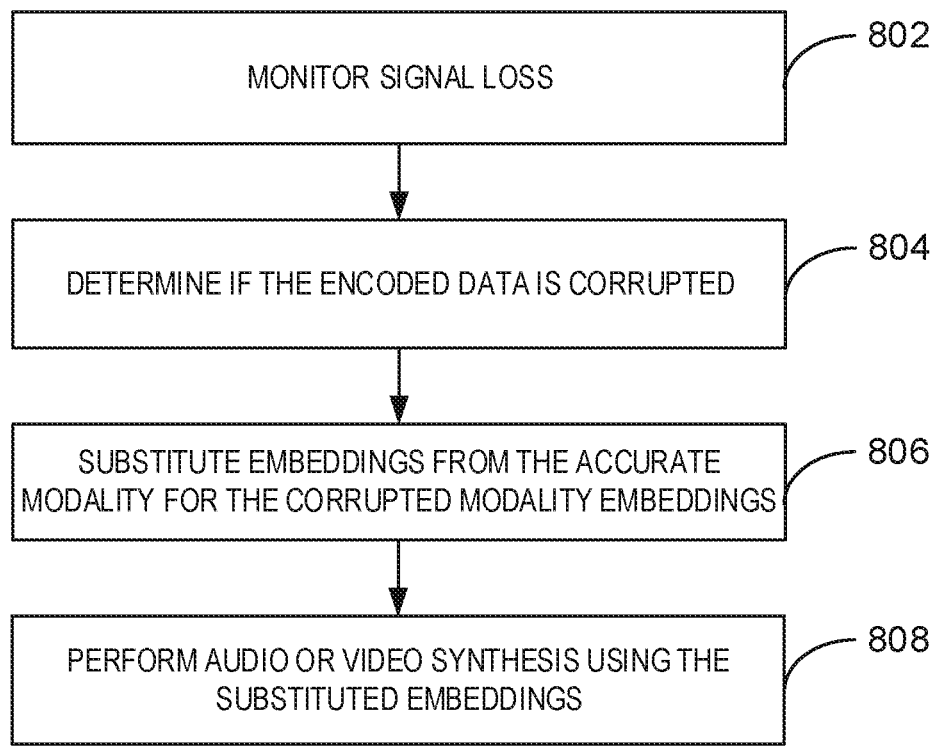
FIG. 8 is a process flow diagram of a method for face-speech bridging by cycle video/audio reconstruction.

FIG. 8 is a process flow diagram of a method 800 for face-speech bridging by cycle video/audio reconstruction. In particular, the method 800 enables processing data streams of audio and video capturing a speaking person to improve correlation between facial movement of the person's lips in the video stream displayed and the corresponding audio output of the person's voice and/or correct for data loss in the video or audio data stream. At block 802, signal loss of an audio/video signal is monitored. In embodiments, signal loss may represent some interruption or irregularity the input data signal. In response to the loss being greater than a pre-determined threshold, at block 804 corruption in each modality is determined. In particular, corruption is determined in the audio modality or the video modality. At block 806, in response to a corrupted modality or the detection of signal loss or other corruption in the modality, embeddings from the non-corrupted modality are substituted for the embeddings of the corrupted modality. For example, if the audio modality is corrupted, video embeddings may be substituted for the corrupted embeddings of the audio modality. Similarly, if the video modality is corrupted, audio embeddings may be substituted for the corrupted embeddings of the video modality. At block 808, audio or video synthesis is performed using the substituted embeddings.

In one embodiment, the process flow diagrams of FIGS. 7 and 8 are intended to indicate that the steps of the methods 700 and 800 are to be executed in a particular order. Alternatively, in other embodiments, the steps of the methods 700 and 800 can be executed in any suitable order and any suitable number of the steps of the methods 700 and 800 can be included. Further, any number of additional steps may be included within the methods 700 and 800, depending on the specific application.

The present techniques enable an improvement audio-visual playback quality. For example, consider a scenario where a video conference suffers from connection issues such that either of the audio or video channels experience data signal loss. Often, one of the audio channel or video channels still has information to render. Traditionally, when video freezes audio playback often continues, and when audio is unavailable videos typically keep playing. In these situations, the present techniques enable a bridge from the informative modality to the corrupt modality to reconstruct the lost information in the corrupt modality. The present techniques can also potentially be a tool for audio-visual speech/emotion recognition, since it finds a rich common space in which informative representations of a speech sequence (either video or audio) are stored and coded. Another potential beneficial application of the present techniques includes lipreading for people with visual impairments, where the model described herein can assist people with visual impairments to better communicate, especially in noisy places. Moreover, the present techniques can handle many speakers at the same time. Further, the present techniques may also be immune to overfitting, computational limitations, and proper network architectures. By using mutual encoding for audio/video data, a reliable and robust backbone network for encoding may be established. The common space enables audio-visual data recognition. Moreover, the two-way modality bridging enables video/audio enhancement. Finally, the present techniques enable cross-modal interpolation in real-time.

Figure 9:
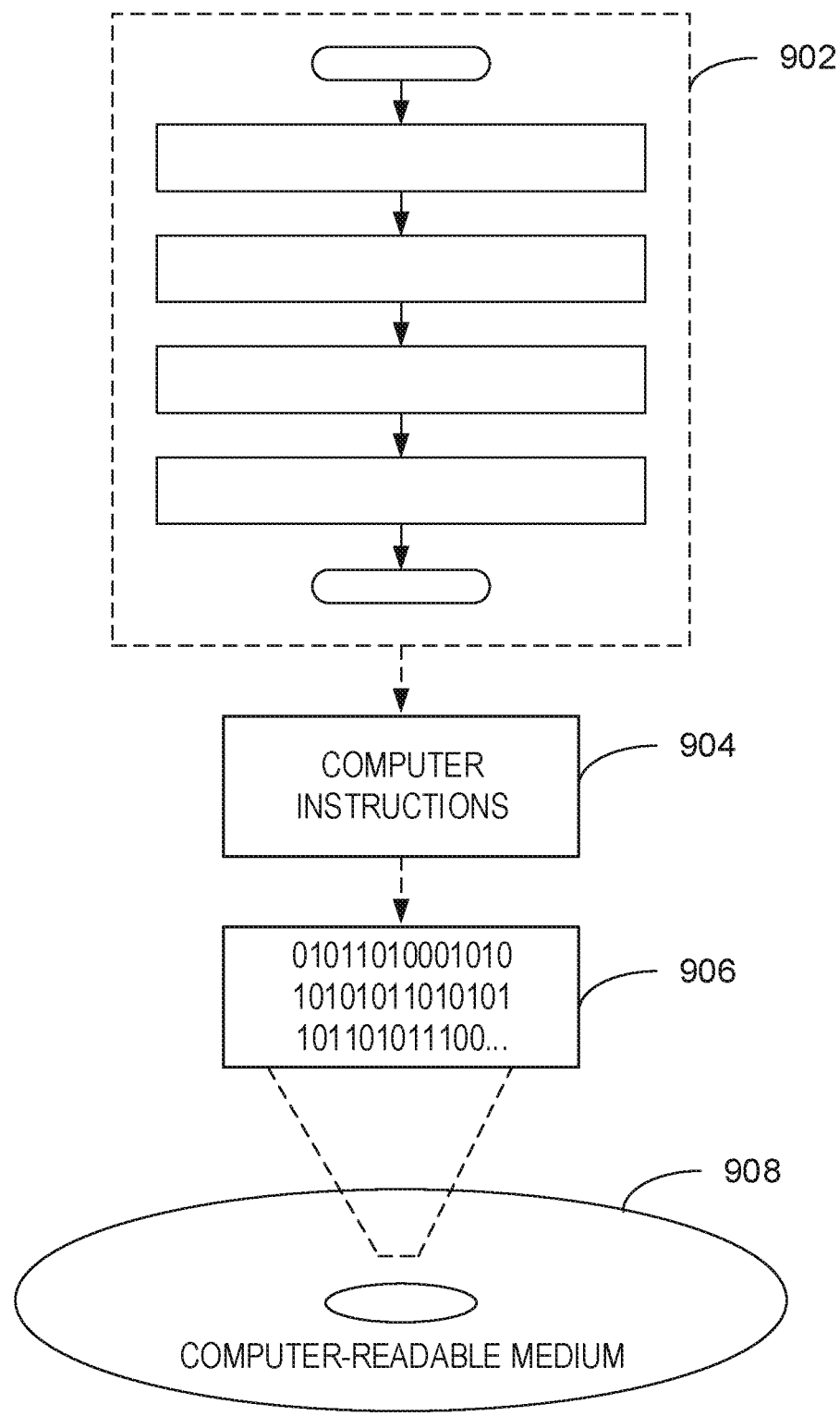
FIG. 9 is a block diagram illustrating an exemplary computer readable medium encoded with instructions to enable face-speech bridging by cycle audio/video reconstruction according to aspects of the disclosed subject matter.

Turning to FIG. 9, FIG. 9 is a block diagram illustrating an exemplary computer readable medium encoded with instructions to enable face-speech bridging by cycle audio/video reconstruction according to aspects of the disclosed subject matter. More particularly, the implementation 900 comprises a computer-readable medium 908 (e.g., a CD-R, DVD-R or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary method 700 of FIG. 7 or the exemplary method 800 of FIG. 8, for example. In another such embodiment, the processor-executable instructions 904 may be configured to implement a system, such as at least some of the exemplary system 1000 of FIG. 10, as described below. Many such computer-readable media may be devised by those of ordinary skill in the art that are configured to operate in accordance with the techniques presented herein.

Turning to FIG. 10, FIG. 10 is a block diagram illustrating an exemplary computing device 1000 that enables face-speech bridging by cycle audio/video reconstruction according to aspects of the disclosed subject matter. The exemplary computing device 1000 includes one or more processors (or processing units), such as processor 1002, and a memory 1004. The processor 1002 and memory 1004, as well as other components, are interconnected by way of a system bus 1010. The memory 1004 typically (but not always) comprises both volatile memory 1006 and non-volatile memory 1008. Volatile memory 1006 retains or stores information so long as the memory is supplied with power. By contrast, non-volatile memory 1008 is capable of storing (or persisting) information even when a power supply is not available. Generally speaking, RAM and CPU cache memory are examples of volatile memory 1006 whereas ROM, solid-state memory devices, memory storage devices, and/or memory cards are examples of non-volatile memory 1008.

The processor 1002 executes instructions retrieved from the memory 1004 (and/or from computer-readable media, such as computer-readable medium 708 of FIG. 7) in carrying out various functions of face-speech bridging by cycle audio/video reconstruction as described above. The processor 1002 may be comprised of any of a number of available processors such as single-processor, multi-processor, single-core units, and multi-core units.

Figure 11:
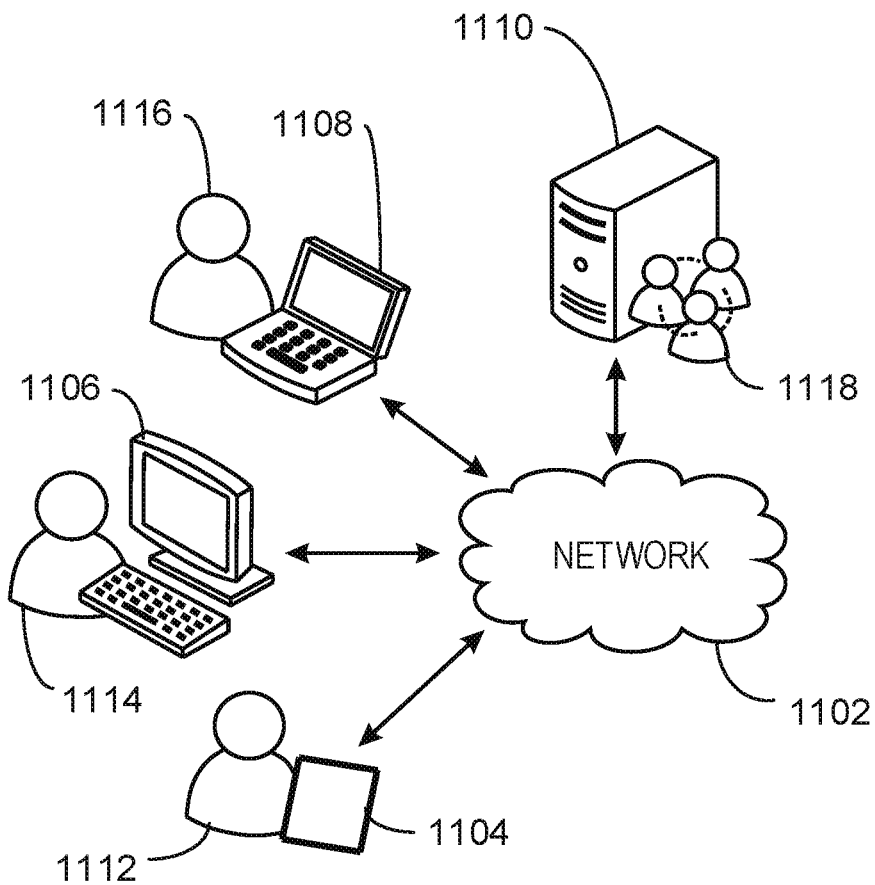
FIG. 11 is a block diagram illustrating an exemplary network environment suitable for implementing aspects of the disclosed subject matter.

Further still, the illustrated computing device 1000 includes a network communication component 1012 for interconnecting this computing device with other devices and/or services over a computer network, including other user devices, such as user computing devices 1104, 1106, 1108, and 1110 as illustrated in FIG. 11. The network communication component 1012, sometimes referred to as a network interface card or NIC, communicates over a network (such as network 1102) using one or more communication protocols via a physical/tangible (e.g., wired, optical, etc.) connection, a wireless connection, or both. As will be readily appreciated by those skilled in the art, a network communication component, such as network communication component 1012, is typically comprised of hardware and/or firmware components (and may also include or comprise executable software components) that transmit and receive digital and/or analog signals over a transmission medium (i.e., the network.)

The computing device 1000 also includes an I/O subsystem 1014. As will be appreciated, an I/O subsystem comprises a set of hardware, software, and/or firmware components that enable or facilitate inter-communication between a user of the computing device 1000 and the processing system of the computing device 1000. Indeed, via the I/O subsystem 1014 a computer operator may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer operator and the computing device 1000 is enabled via the I/O subsystem 1014 of the computing device.

The computing device 1000 further comprises an audio autoencoder 1016, a video autoencoder 1018, and a common space 1020. In operation/execution, the audio autoencoder 1016 and the video autoencoder 1018 are communicatively coupled via the common space 1020. The common space 1020 serves as a bridge between the audio and video modalities, wherein data from a first modality can be substituted for data from the other modality in real time. Each of the audio autoencoder 1016 and the video autoencoder are independently trained such that the dimensionality of the mid-level representations of video data and the mid-level representations of audio data are similar, the same, or substantially the same. In embodiments, the mid-level representations are of the same dimensionality. In embodiments, the output of face-speech bridging as described herein may be output visually on one or more displays coupled with the computing device 1000. For example, the computing device 1000 can include a display interface to output video data from a video autoencoder. The computing device 1000 can include an audio interface to output audio data from an audio autoencoder. In this manner, audio and display hardware may be used to output data according to the present techniques.

The block diagram of FIG. 10 is not intended to indicate that the computing device 1000 is to include all of the components shown in FIG. 10. Rather, the computing device 1000 can include fewer or additional components not illustrated in FIG. 10, such as additional buffers, additional processors, and the like. The computing device 1000 may include any number of additional components not shown in FIG. 10, depending on the details of the specific implementation. Furthermore, any of the functionalities of the audio autoencoder 1016, video autoencoder 1018, and common space 1020 may be partially, or entirely, implemented in hardware and/or in the processor 1002. For example, the functionality may be implemented with an application specific integrated circuit, in logic implemented in the processor 1002, or in any other device.

Turning now to FIG. 11, FIG. 11 is a block diagram illustrating an exemplary network environment 1100 suitable for implementing aspects of the disclosed subject matter. The network environment 1100 includes user computers 1104, 1106, 1108, and 1110. Each user computer corresponds to one or more computer users. Thus, user computers 1104, 1106, 1108, and 1110 correspond to computer users/collaborators 1112, 1114, 1116, and 1118, respectively. As suggested above, a computer user, such as computer user 1114, may be engaging in a conference call across network 1102 via the corresponding user computer 1106. In an example, the user computers 1104, 1108, and 1110 may receive audio/video data from the computer user 1114 across the network 1102.

In the event that the audio or video signal information of computer user 1114 as captured by the corresponding user computer 1106 and transmitted across the network 1102 becomes corrupted, the present techniques enable a first mid-level representation of data from a first modality to be substituted for a second mid-level representation of data from a second modality during the reconstruction of the input of the second modality. An audio autoencoder, video autoencoder, and common space may execute on each of the user computers 1104, 1106, 1108, and 1110 to provide bridging as described herein.

While various novel aspects of the disclosed subject matter have been described, it should be appreciated that these aspects are exemplary and should not be construed as limiting. Variations and alterations to the various aspects may be made without departing from the scope of the disclosed subject matter.

Examples

Example 1 is a method. The method includes encoding audio data and video data via a mutual autoencoders that comprise an audio autoencoder and a video autoencoder, wherein the mutual autoencoders share a common space with corresponding embeddings derived by each of the audio autoencoder and the video autoencoder. The method also includes substituting embeddings from a non-corrupted modality for corresponding corrupted embeddings in a corrupted modality in real-time based at least in part on corrupted audio data or corrupted video data, and synthesizing reconstructed audio data and reconstructed video data based, at least in part on the substituted embeddings.

Example 2 includes the method of example 1, including or excluding optional features. In this example, the method includes deriving audio embeddings from the audio autoencoder and video embeddings from the video autoencoder, wherein the audio embeddings corresponding to the video embeddings are similar.

Example 3 includes the method of any one of examples 1 to 2, including or excluding optional features. In this example, the corresponding embeddings are derived according to a bottleneck loss function of the audio autoencoder and the video autoencoder, wherein the bottleneck loss function comprises a mean square error-correlation coefficient (MSE-Corr2) loss ($\mathcal{L}_{MC2}$) applied to the embeddings.

Example 4 includes the method of any one of examples 1 to 3, including or excluding optional features. In this example, the method includes determining if the audio data or the video data is corrupted when a data stream of the audio data or the video data experiences signal loss.

Example 5 includes the method of any one of examples 1 to 4, including or excluding optional features. In this example, the reconstructed video data is synthesized using landmarks derived from the substituted embeddings.

Example 6 includes the method of any one of examples 1 to 5, including or excluding optional features. In this example, the reconstructed audio data is synthesized using a spectrogram, aperiodicities, and a fundamental frequency derived from the substituted embeddings.

Example 7 includes the method of any one of examples 1 to 6, including or excluding optional features. In this example, the corresponding embeddings derived by each of the audio autoencoder and the video autoencoder are of the same dimensionality as the common space.

Example 8 is a system. The system includes an audio autoencoder to derive audio embeddings and a video autoencoder to derive video embeddings, wherein the audio autoencoder and the video autoencoder are mutual autoencoders. The system also includes a common space, wherein the audio autoencoder and the video autoencoder share a common space and the audio embeddings correspond to the video embeddings, and based at least in part on a corrupted audio data or a corrupted video data, substituting embeddings from a non-corrupted modality for the corresponding embeddings in a corrupted modality in real-time.

Example 9 includes the system of example 8, including or excluding optional features. In this example, the system includes synthesizing reconstructed audio data or reconstructed video data based on, at least in part, the substituted embeddings.

Example 10 includes the system of any one of examples 8 to 9, including or excluding optional features. In this example, the audio autoencoder and the video autoencoder comprise mutually defined loss functions.

Example 11 includes the system of any one of examples 8 to 10, including or excluding optional features. In this example, audio data or video data is corrupted when a respective signal loss of the audio data or video data exceeds a threshold.

Example 12 includes the system of any one of examples 8 to 11, including or excluding optional features. In this example, the substituted embeddings enable cross-modality interpolation of the corrupted modality in real-time.

Example 13 includes the system of any one of examples 8 to 12, including or excluding optional features. In this example, the corresponding embeddings derived by each of the audio autoencoder and the video autoencoder are of the same dimensionality as the common space.

Example 14 is a method. The method includes training a pair of autoencoders independently, wherein the pair of autoencoders comprises an audio autoencoder and a video autoencoder. The method also includes deriving a bridge across an audio modality of the audio autoencoder and a video modality of the video autoencoder, wherein audio embeddings of the audio autoencoder and video embeddings of the video autoencoder are of the same dimensions in a common space shared by the audio autoencoder and the video autoencoder. Further, the method includes substituting corresponding embeddings from a modality without data loss based at least in part on data loss in one of the audio modality or the video modality.

Example 15 includes the method of example 14, including or excluding optional features. In this example, an embedding is a same representation of data across each modality.

Example 16 includes the method of any one of examples 14 to 15, including or excluding optional features. In this example, training the pair of autoencoders independently comprises determining a common space representative of the audio embeddings and the video embeddings.

Example 17 includes the method of any one of examples 14 to 16, including or excluding optional features. In this example, the audio autoencoder and the video autoencoder minimize a bottleneck loss function that comprises a mean square error-correlation coefficient (MSE-Corr2) loss ( $\mathcal{L}_{MC2}$ ) applied to the audio embeddings and the video embeddings.

Example 18 includes the method of any one of examples 14 to 17, including or excluding optional features. In this example, a loss function used to train the audio autoencoder applies a mean square error-correlation coefficient (MSE-Corr2) loss ( $\mathcal{L}_{MC2}$ ) to an original audio data input and a reconstruction of the original audio data input.

Example 19 includes the method of any one of examples 14 to 18, including or excluding optional features. In this example, a loss function used to train the video autoencoder applies a mean square error-correlation coefficient (MSE-Corr2) loss ( $\mathcal{L}_{MC2}$ ) to an original video data input and a reconstruction of the original video data input.

Example 20 includes the method of any one of examples 14 to 19, including or excluding optional features. In this example, the common space is of a reduced dimensionality when compared to an original dimension of input data, wherein the input data comprises audio data and video data.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method, comprising:
    encoding audio data and video data via a mutual autoencoders that comprise an audio autoencoder and a video autoencoder, wherein the mutual autoencoders share a common space with corresponding embeddings derived by each of the audio autoencoder and the video autoencoder;
    substituting embeddings from a non-corrupted modality for corresponding corrupted embeddings in a corrupted modality in real-time based at least in part on corrupted audio data or corrupted video data; and
    synthesizing reconstructed audio data and reconstructed video data based, at least in part on the substituted embeddings.

2. The method of claim 1, comprising deriving audio embeddings from the audio autoencoder and video embeddings from the video autoencoder, wherein the audio embeddings corresponding to the video embeddings are similar.

3. The method of claim 1, wherein the corresponding embeddings are derived according to a bottleneck loss function of the audio autoencoder and the video autoencoder, wherein the bottleneck loss function comprises a mean square error-correlation coefficient (MSE-Corr2) loss ($\mathcal{L}_{MC2}$) applied to the embeddings.

4. The method of claim 1, comprising determining if the audio data or the video data is corrupted when a data stream of the audio data or the video data experiences signal loss.

5. The method of claim 1, wherein the reconstructed video data is synthesized using landmarks derived from the substituted embeddings.

6. The method of claim 1, wherein the reconstructed audio data is synthesized using a spectrogram, aperiodicities, and a fundamental frequency derived from the substituted embeddings.

7. The method of claim 1, wherein the corresponding embeddings derived by each of the audio autoencoder and the video autoencoder are of the same dimensionality as the common space.

8. A system, comprising:
    an audio autoencoder to derive audio embeddings;
    a video autoencoder to derive video embeddings, wherein the audio autoencoder and the video autoencoder are mutual autoencoders;
    a common space, wherein the audio autoencoder and the video autoencoder share a common space and the audio embeddings correspond to the video embeddings, and based at least in part on a corrupted audio data or a corrupted video data, substituting embeddings from a non-corrupted modality for the corresponding embeddings in a corrupted modality in real-time.

9. The system of claim 8, comprising synthesizing reconstructed audio data or reconstructed video data based on, at least in part, the substituted embeddings.

10. The system of claim 8, wherein the audio autoencoder and the video autoencoder comprise mutually defined loss functions.

11. The system of claim 8, wherein audio data or video data is corrupted when a respective signal loss of the audio data or video data exceeds a threshold.

12. The system of claim 8, wherein the substituted embeddings enable cross-modality interpolation of the corrupted modality in real-time.

13. The system of claim 8, wherein the corresponding embeddings derived by each of the audio autoencoder and the video autoencoder are of the same dimensionality as the common space.

14. A method, comprising:
    training a pair of autoencoders independently, wherein the pair of autoencoders comprises an audio autoencoder and a video autoencoder;
    deriving a bridge across an audio modality of the audio autoencoder and a video modality of the video autoencoder, wherein audio embeddings of the audio autoencoder and video embeddings of the video autoencoder are of the same dimensions in a common space shared by the audio autoencoder and the video autoencoder; and
    substituting corresponding embeddings from a modality without data loss based at least in part on data loss in one of the audio modality or the video modality.

15. The method of claim 14, wherein an embedding is a same representation of data across each modality.

16. The method of claim 14, wherein training the pair of autoencoders independently comprises determining a common space representative of the audio embeddings and the video embeddings.

17. The method of claim 14, wherein the audio autoencoder and the video autoencoder minimize a bottleneck loss function that comprises a mean square error-correlation coefficient (MSE-Corr2) loss ($\mathcal{L}_{MC2}$) applied to the audio embeddings and the video embeddings.

18. The method of claim 14, wherein a loss function used to train the audio autoencoder applies a mean square error-correlation coefficient (MSE-Corr2) loss ($\mathcal{L}_{MC2}$) to an original audio data input and a reconstruction of the original audio data input.

19. The method of claim 14, wherein a loss function used to train the video autoencoder applies a mean square error-correlation coefficient (MSE-Corr2) loss ($\mathcal{L}_{MC2}$) to an original video data input and a reconstruction of the original video data input.

20. The method of claim 14, wherein the common space is of a reduced dimensionality when compared to an original dimension of input data, wherein the input data comprises audio data and video data.

* * * * *